US012614411B2

(12) United States Patent
Underwood et al.

(10) Patent No.: US 12,614,411 B2
(45) Date of Patent: Apr. 28, 2026

(54) SYSTEM AND METHOD FOR AUTOMATED LOGGING AND REPORTING OF AIRCRAFT MAINTENANCE EVENTS

(71) Applicant: ARINC Incorporated, Annapolis, MD (US)

(72) Inventors: Darin M. Underwood, Cedar Rapids, IA (US); Subhashish Chakravarty, Marion, IA (US); Ross D. Anderson, Lakeville, MN (US)

(73) Assignee: ARING Incorporated, Annapolis, MD (US)

( * ) Notice: Subject to any disclaimer, the term of this patent is extended or adjusted under 35 U.S.C. 154(b) by 300 days.

(21) Appl. No.: 18/127,245

(22) Filed: Mar. 28, 2023

(65) Prior Publication Data

US 2024/0331453 A1 Oct. 3, 2024

(51) Int. Cl.
*G07C 5/00* (2006.01)
*B64D 45/00* (2006.01)

(52) U.S. Cl.
CPC ............. *G07C 5/006* (2013.01); *B64D 45/00* (2013.01); *B64D 2045/0085* (2013.01)

(58) Field of Classification Search
CPC ...... G07C 5/006; G07C 5/008; G07C 5/0808; G07C 5/0816; G07C 5/085; B64D 45/00; B64D 2045/0085; B64F 5/40; B64F 5/60; G08G 5/21; G08G 5/26; G06Q 10/20
See application file for complete search history.

(56) References Cited

U.S. PATENT DOCUMENTS

| | | | | |
|---|---|---|---|---|
| 4,943,919 A | * | 7/1990 | Aslin | ..................... G07C 5/006 |
| | | | | 701/32.7 |
| 7,072,746 B1 | | 7/2006 | Burch | |
| 8,255,097 B1 | | 8/2012 | Wander | |

(Continued)

FOREIGN PATENT DOCUMENTS

| | | |
|---|---|---|
| EP | 2225638 B1 | 6/2015 |
| EP | 3667253 B1 | 2/2022 |
| MX | 2015001426 A | 7/2016 |

OTHER PUBLICATIONS

European Patent Office, Extended European Search Report received in EP Application No. 24167643.6, May 8, 2024, 7 pages.

(Continued)

*Primary Examiner* — Justin S Lee
(74) *Attorney, Agent, or Firm* — Suiter Swantz IP

(57) ABSTRACT

An aircraft-based system and method for automated reporting and logging of aircraft maintenance events receives flight deck effects (FDEs) with correlated maintenance messages indicating maintenance statuses (e.g., faults and/or failures) and/or Air Transport Association (ATA) classifications for each reporting aircraft system, subsystem or component. The logging system generates event messages based on each received FDE, predicting additional information based on the correlated maintenance message such as recommended maintenance actions, replacement parts or components, and/or Minimum Equipment List (MEL) actions associated with a component fault or failure. Event messages are automatically transmitted via datalink to ground-based maintenance and dispatch. Further, event messages are automatically logged to an aircraft maintenance log.

17 Claims, 4 Drawing Sheets

(56)    References Cited

U.S. PATENT DOCUMENTS

|  |  |  |  |  |
|---|---|---|---|---|
| 8,700,236 | B1 | 4/2014 | Berman | |
| 9,542,782 | B2 | 1/2017 | Blank | |
| 9,663,242 | B2 | 5/2017 | Fournier et al. | |
| 10,049,081 | B2 | 8/2018 | Henkel | |
| 10,417,840 | B2 | 9/2019 | O'Dell et al. | |
| 10,787,278 | B2 * | 9/2020 | Huber | G07C 5/0808 |
| 2002/0103865 | A1 | 8/2002 | Lilly | |
| 2004/0106404 | A1 | 6/2004 | Gould et al. | |
| 2007/0129973 | A1 | 6/2007 | Wollenberg | |
| 2007/0215745 | A1 | 9/2007 | Fleury et al. | |
| 2013/0079972 | A1 | 3/2013 | Lake et al. | |
| 2015/0375870 | A1 | 12/2015 | Poisson, Jr. et al. | |
| 2017/0132851 | A1 | 5/2017 | Blackman | |
| 2017/0291722 | A1 | 10/2017 | Owens et al. | |
| 2019/0100335 | A1 * | 4/2019 | Huber | G07C 5/008 |
| 2019/0102957 | A1 * | 4/2019 | Huber | G06Q 50/40 |
| 2019/0156447 | A1 | 5/2019 | Curci | |
| 2020/0380794 | A1 * | 12/2020 | Lake | G07C 5/0816 |
| 2020/0391881 | A1 * | 12/2020 | Elshrif | G06F 9/546 |
| 2021/0097058 | A1 | 4/2021 | Skiles et al. | |
| 2022/0036205 | A1 * | 2/2022 | Kallappa | G06N 5/022 |

OTHER PUBLICATIONS

John B. Maggiore, "Remote Management of Real-Time Airplane Data", Aero Quarterly, QTR_03 / 2007, pp. 22-27.

* cited by examiner

Figure 3A:
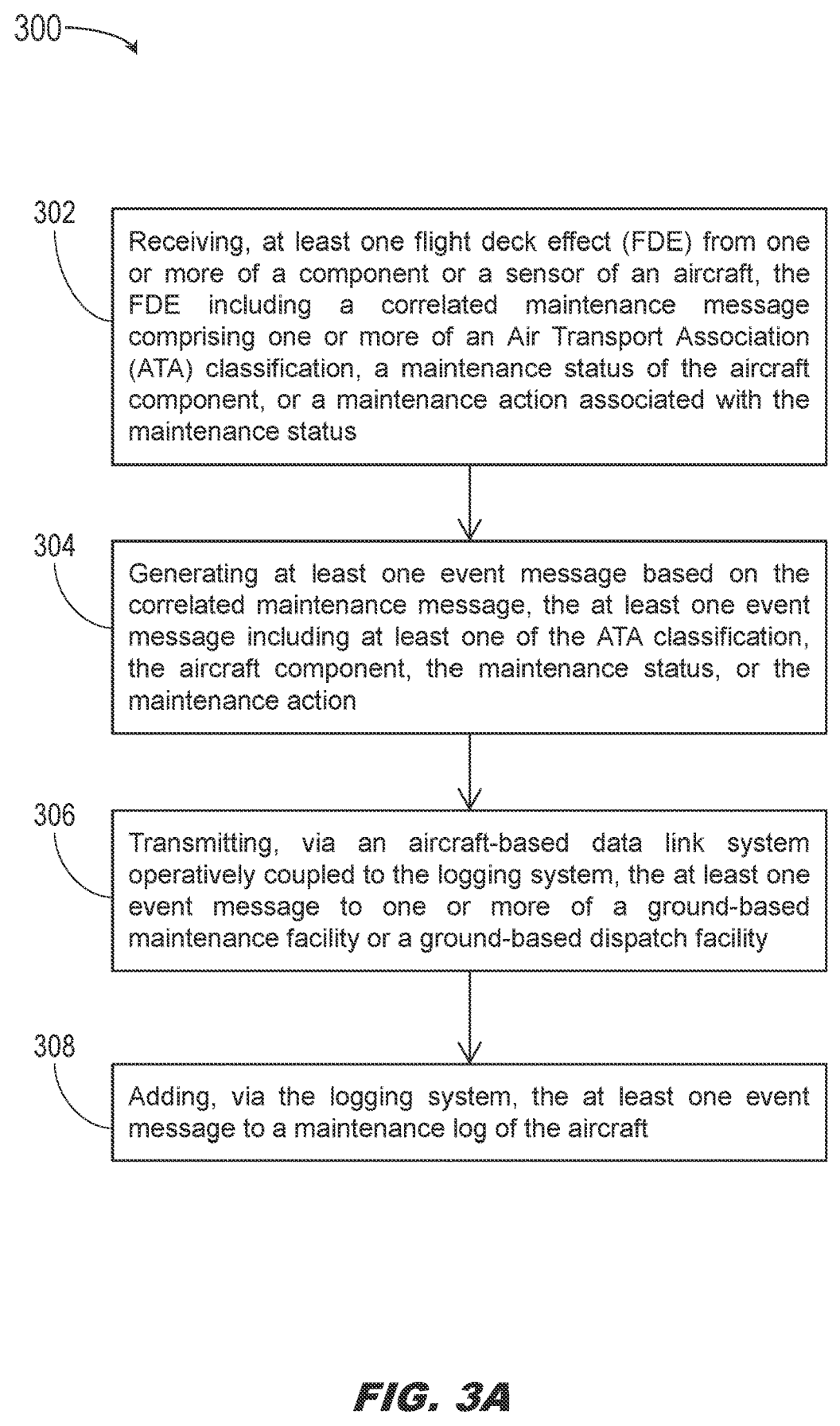

300

302

Receiving, at least one flight deck effect (FDE) from one or more of a component or a sensor of an aircraft, the FDE including a correlated maintenance message comprising one or more of an Air Transport Association (ATA) classification, a maintenance status of the aircraft component, or a maintenance action associated with the maintenance status

304

Generating at least one event message based on the correlated maintenance message, the at least one event message including at least one of the ATA classification, the aircraft component, the maintenance status, or the maintenance action

306

Transmitting, via an aircraft-based data link system operatively coupled to the logging system, the at least one event message to one or more of a ground-based maintenance facility or a ground-based dispatch facility

308

Adding, via the logging system, the at least one event message to a maintenance log of the aircraft

Presenting, via at least one interactive display operatively coupled to the logging system, the at least one event message to an operator for approval

312

Receiving, via the at least one interactive display, control input from the operator

SYSTEM AND METHOD FOR AUTOMATED LOGGING AND REPORTING OF AIRCRAFT MAINTENANCE EVENTS

BACKGROUND

Modern aircraft systems and subsystems are connected to crew alerting systems (CAS) which notify the aircraft crew when a particular system, subsystem, component, or part is in need of routine maintenance or fails entirely. For example, the system or component in question may have required redundant backup units, in which case repair or replacement may be addressed in the medium to long term once the current flight is completed. In some cases, however, a system or component failure may present a more serious mainte- nance issue that requires service as soon as possible once the aircraft has landed, and that may adversely affect future use of the aircraft until the issue is resolved.

In any event, aircraft pilots and crew must manually record reported failures in the aircraft logbook (or electronic equivalent thereof) and must manually report said failures to ground-based maintenance technicians. This is a time-con- suming activity that requires crew availability, but also lacks real-time feedback. Troubleshooting and repair by ground crew often includes inferring or deciphering the necessary information, and retrieving the necessary replacement parts, to effect targeted repairs and/or diagnose medium to long term effects on the availability of the aircraft for future use (e.g., the extent to which an aircraft may be safely used until an affected subsystem or component must be repaired or replaced).

SUMMARY

In a first aspect, an aircraft-based system for automated reporting and logging of aircraft maintenance events and/or flight deck effects (FDE) is disclosed. In embodiments, the system receives FDEs correlated with maintenance mes- sages from aircraft components, systems, subsystems, and/ or sensor banks. For example, the correlated maintenance message identifies the reporting system or component, a maintenance status of the reporting system or component, and/or Air Transport Association (ATA) chapters/subchap- ters based on the reported status. The maintenance message may include recommended maintenance actions (e.g., repairs, replacements) based on the maintenance status. Based on the correlated maintenance message, the system generates an event message including the reporting compo- nent and associated maintenance status and ATA classifica- tions. The system automatically transmits the event message to ground-based maintenance and/or dispatch personnel (e.g., at the aircraft's destination airport) for further action, e.g., sourcing and routing of any necessary replacement parts so that maintenance crew are ready to follow up on maintenance actions when the aircraft lands and dispatch crew are updated as to any changes in aircraft flightworthi- ness. The system automatically adds event messages to an aircraft maintenance log.

In some embodiments, the logging system predicts asso- ciated ATA classifications based on the correlated mainte- nance event.

In some embodiments, the logging system predicts replacement parts and/or replacement components based on the correlated maintenance event, adding the inferred replacement parts/components to the event message.

In some embodiments, the logging system predicts addi- tional maintenance actions based on the correlated maintenance event (e.g., maintenance actions that may not have been included in the maintenance message), adding the predicted maintenance actions to the event message.

In some embodiments, the predicted maintenance actions include Minimum Equipment List (MEL) and/or Master MEL (MMEL) actions, e.g., indicating dispatch conse- quences of a particular maintenance status reported by the maintenance message.

In some embodiments, the logging system presents event messages to the pilot or crew for review and approval prior to transmission. If, for example, a pilot/crewmember indi- cates their approval via interactive display, the event mes- sage is transmitted.

In some embodiments, the logging system truncates or otherwise revises a generated event message for optimal transmission via data link prior to transmitting the event message.

In some embodiments, the logging system is embodied in a cockpit-based or aircraft-based component or device, the component or device including a memory for storing the aircraft maintenance log.

In a further aspect, a computer-assisted method for auto- mated reporting and logging of aircraft maintenance events is also disclosed. In embodiments, the method includes receiving, via an onboard logging system, flight deck effects (FDE) correlated with maintenance messages reported by aircraft systems, subsystems, components or sensors. For example, each correlated maintenance message identifies the reporting system or component, an associated maintenance status, and/or Air Transport Associated (ATA) chapters/ subchapters relevant to the maintenance status, and may further include recommended maintenance actions based on the maintenance status. The method includes generating an event message based on the correlated maintenance mes- sage, the event message including the reporting component, reported status, and ATA chapters/subchapters, and recom- mended maintenance actions (if any). The method includes transmitting, via an aircraft-based data link system (e.g., ACARS), the event message to ground-based maintenance and/or dispatch personnel (e.g., at the destination airport) so that action can be promptly taken on the reported mainte- nance status if necessary. The method includes adding the event message to an aircraft maintenance log.

In some embodiments, the method includes predicting ATA chapters or subchapters based on a reported mainte- nance status, and including the predicted ATA classifications in the event message.

In some embodiments, the method includes predicting replacement parts and/or components based on a reported maintenance status, and including the predicted replacement parts in the event message.

In some embodiments, the method includes predicting recommended or mandated maintenance actions based on a reported maintenance status, and including the predicted maintenance actions in the event message.

In some embodiments, the method includes predicting Minimum Equipment List (MEL) actions indicating dis- patch consequences of a reported maintenance status, and including the predicted MEL actions in the event message.

In some embodiments, the method includes truncating or otherwise revising the event message prior to transmission via data link system.

This Summary is provided solely as an introduction to subject matter that is fully described in the Detailed Descrip- tion and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
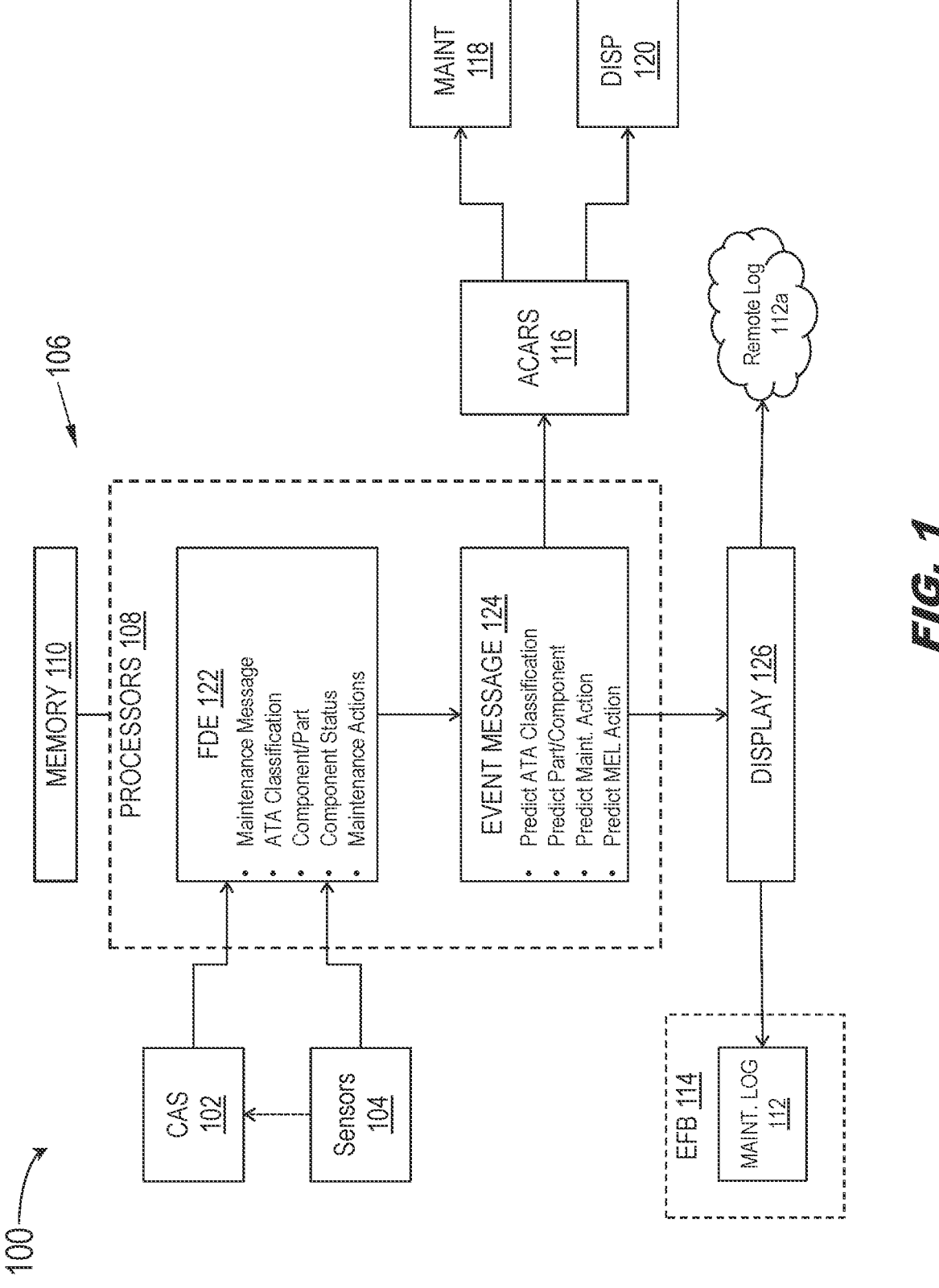
FIG. 1 is a block diagram illustrating an aircraft-based system for automated reporting and logging of aircraft maintenance events according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for automated reporting and logging of aircraft maintenance events. In particular, rather than require pilots and crew to manually report flight deck effects (FDE) and other crew alerting system (CAS) notifications to ground-based maintenance personnel and manually log FDEs and CAS notifications, the logging system organizes the necessary information (e.g., failure and component classifications, affected systems and components, remedial activities, replacement parts and components, dispatch consequences), promptly and automatically informing ground crew of the precise systems or components requiring attention and notifying maintenance personnel to what extent future aircraft operations may be affected. At the same time, accurate documentation of each maintenance event is likewise automatically completed, eliminating the need for later (and perhaps less accurate) manual documentation. When an aircraft lands, for example, ground crew know exactly which faulty systems or components require their immediate attention and have the necessary replacement components to rapidly effect any turnaround fixes. For example, automatic control center notification of maintenance events and/or FDEs may enable automatic sourcing and/or routing of any necessary parts or components to the destination. As a result, aircraft downtime between flights can be minimized. Further, embodiments of the inventive concepts disclosed herein may provide a more complete documentation of maintenance issues and their consequences, both from a maintenance perspective (e.g., which components are affected by a maintenance issue, and precisely which actions and/or parts are necessary to resolve the issue) and from a dispatch perspective (e.g., even if immediate repair or replacement of a part or component is not necessary, how the maintenance issue will affect the aircraft's airworthiness and future maintenance).

Referring now to FIG. 1, an aircraft 100 is shown. The aircraft may include crew alerting systems 102 (CAS) as well as sensor banks 104 for monitoring avionics, interiors, propulsion, electronic, and mechanical systems, subsystems, and components. The reporting and logging system 106 may be a computer-based system including processors 108 and memory 110. The aircraft 100 may further include an electronic maintenance log 112, e.g., embodied in an electronic flight bag 114 (EFB) or like portable computing device or in a cockpit-based system. The aircraft 100 may further include Aircraft Communications Addressing and Reporting System (ACARS) or like data link transmission and reception (TxRx) systems 116 for digital data exchange between the aircraft and ground-based maintenance facilities 118 and/or ground-based aircraft dispatch facilities 120. In some embodiments, the maintenance log 112 may be embodied in an aircraft component, e.g., an integrated electronic log accessible via a cockpit-based or aircraft-based interface, or a cloud-based log (112a) remotely located from the aircraft proper but updated from the cockpit.

In embodiments, the aircraft 100 may be a next-generation aircraft, e.g., wherein the CAS 102 and/or sensor banks 104 receive detailed indicators of maintenance events 122 aboard the aircraft. For example, the CAS 102 may include Engine Indicating and Crew Alerting Systems (EICAS), electronic centralized aircraft monitoring (ECAM), or any other like air management systems or air management control systems. Further, sensors 104 and/or sensor banks may relay maintenance events 122 directly to the reporting and logging system 106 or via a CAS 102. In embodiments, status changes, faults, or failures within an engine, system, subsystem, or component may trigger a flight deck effect 122 (FDE), e.g., a message or alert correlated with a maintenance message indicating the affected engine, system, or component and a maintenance status of the system or component (e.g., nominal, damaged, replace soon/near end of lifecycle, replace now/at end of lifecycle, inoperable). If, for example, the aircraft 100 is a next-generation aircraft, FDEs 122 and correlated maintenance messages relayed by the CAS 102 and/or sensors 104 may include one or more Air Transport Association (ATA) codes or classifications (e.g., chapters, subchapters) specifically identifying the system or component triggering a maintenance event. ATA classifications may identify a type or category of system or component (e.g., doors) or aircraft zone/subzone (e.g., left wing, left wing outboard aileron), a specific component within the category (e.g., emergency exit door, landing gear door, door warning system), and/or a specific part of an identified component (e.g., a particular emergency exit door, a switch or lamp within a door warning system). Further, maintenance messages correlated with FDEs 122 may be assessed and categorized in terms of severity, e.g., warning alerts requiring immediate attention and response; caution alerts requiring immediate attention and subsequent (but not necessarily immediate) response; advisory alerts of a non-critical nature but that require awareness by the flight crew; and/or system/component status messages that do not require action. In some embodiments, the logging system 106 may predict additional recommended maintenance actions based on a particular FDE 122, e.g., repair or replacement of a particular part or component in the event of a failure or fault, or if the maintenance event/FDE indicates a lifespan of the part or component has elapsed or will imminently elapse.

In embodiments, the reporting/logging system 106 may include automated reasoning agents for validation of pertinent component status data generated by the sensors 104 to confirm or reject a sensed part failure or other component status. For example, if the maintenance event 122 is based on a part failure reported by the sensors 104, the automated reasoning agents may confirm or reject the sensor data, e.g., by performing one or more validation checklists associated with the pertinent part or component, and add the determined confirmation or rejection to the maintenance event for reporting and logging.

In embodiments, the reporting/logging system 106 may include automated reasoning agents trained via machine learning to predict any Minimum Equipment List (MEL; also Master MEL (MMEL)) actions associated with a maintenance message correlated with an FDE 122 (e.g., based on a maintenance status and/or recommended maintenance action referenced by the maintenance message). For example, the aircraft 100 may be subject to minimum equipment requirements which determine the specific instruments and equipment that may be inoperable (or other related conditions which may be present) without precluding aviation operations. Some instruments and components, for example, may be inoperable if the aircraft 100 includes operational redundant backups. A MEL may be applicable to a specific aircraft 100 (e.g., tail number) and assigned to an airline, while a MMEL may be more broadly applicable across an aircraft make and model and assigned to a manufacturer (such that a MEL is a highly specific MMEL).

In embodiments, given a received maintenance event 122, the logging system 106 may generate an event message 124 documenting the maintenance message correlated with the FDE 122 and any associated component identifiers, maintenance statuses, ATA codes, and/or maintenance actions. Further, the logging system 106 may predict one or more M/MEL actions for inclusion in the event message 124 based on the maintenance event 122. For example, based on a particular maintenance event 122, the logging system 106 may be trained (e.g., via supervised machine learning) to predict associated M/MEL actions based on the reporting components, maintenance statuses, and/or ATA codes referenced by the maintenance message: failure or fault classes; dispatch consequences of the maintenance status (GO, GO IF (e.g., with conditions), NO GO); rectification intervals (e.g., the amount of time the aircraft 100 may continue operations with inoperative components before repairs must be effected); and remedial actions (e.g., repeatability and reproducibility (R&R) of a particular maintenance status or event; troubleshooting steps taken; maintenance checklists for ground crew charged with addressing a particular maintenance status). In embodiments, a MEL action may not, like other maintenance actions, provide for replacement of parts or components but may instead indicate the consequences of a particular maintenance status to ground-based aircraft dispatch facilities 120. For example, a component fault or failure may affect the total number of components of that type remaining operational aboard the aircraft 100, which may in turn affect the maximum flying time or flying distance achievable by the aircraft according to the MEL (e.g., 4 hours vs. 6 hours) or a rectification interval, e.g., a time window mandated by the MEL within which the faulty component must be repaired or replaced (e.g., 10 days).

In embodiments, the logging system 106 may forward the event message 124 to ground-based maintenance facilities 118 and ground-based dispatch facilities 120, e.g., via ACARS 116 or any like air-to-ground data link. For example, a standardized event message 124 format may be observed such that maintenance facilities 118 and dispatch facilities 120 receive the same event message, wherein any information relevant to aircraft maintenance and dispatch consequences may be contained within a single event message. In some embodiments, the logging system 106 may further predict, and include within the event message 124, any necessary replacement parts or components for responding to a particular maintenance message correlated with an FDE 122 (e.g., or for fulfilling associated or predicted maintenance actions based on a correlated maintenance status). For example, ground-based maintenance crew 118 may be advised via event message 124 of the specific replacement parts and/or components needed for resolving a maintenance status or issue correlated with an FDE 122, such that a maintenance crew may meet the aircraft 100 upon landing and quickly repair or replace any necessary parts or components referenced by the maintenance issue. In some embodiments, the event message 124 may be revised prior to transmission, e.g., truncated or condensed to an optimal file size for transmission via ACARS or appropriate data link protocol.

In embodiments, the logging system 106 may further log any event messages 124 based on a maintenance message correlated with the received FDE 122 to the aircraft maintenance log 112. For example, the maintenance log 112 may be embodied in a processor-executable application or applications running on an EFB 114, e.g., via a portable computing device or cockpit-based processing system. Alternatively, as noted above the maintenance log 112 may be remotely located from the aircraft 100, e.g., in cloud-based storage. In some embodiments, an event message 124 for logging to the maintenance log 112 may be displayed (e.g., via cockpit-based or EFB-based display 126) to the pilot and/or flight crew for review and approval. For example, the event message 124 may be automatically entered into the maintenance log 112 when control input submitted by the pilot or flight crew (e.g., via a touchscreen or other like interactive display 126 configured to accept said control input) indicates approval of the event message. In some embodiments, the interactive display 126 may provide for annotation or modification of an event message 124 by the pilot or flight crew prior to entry into the maintenance log 112.

Figure 2:
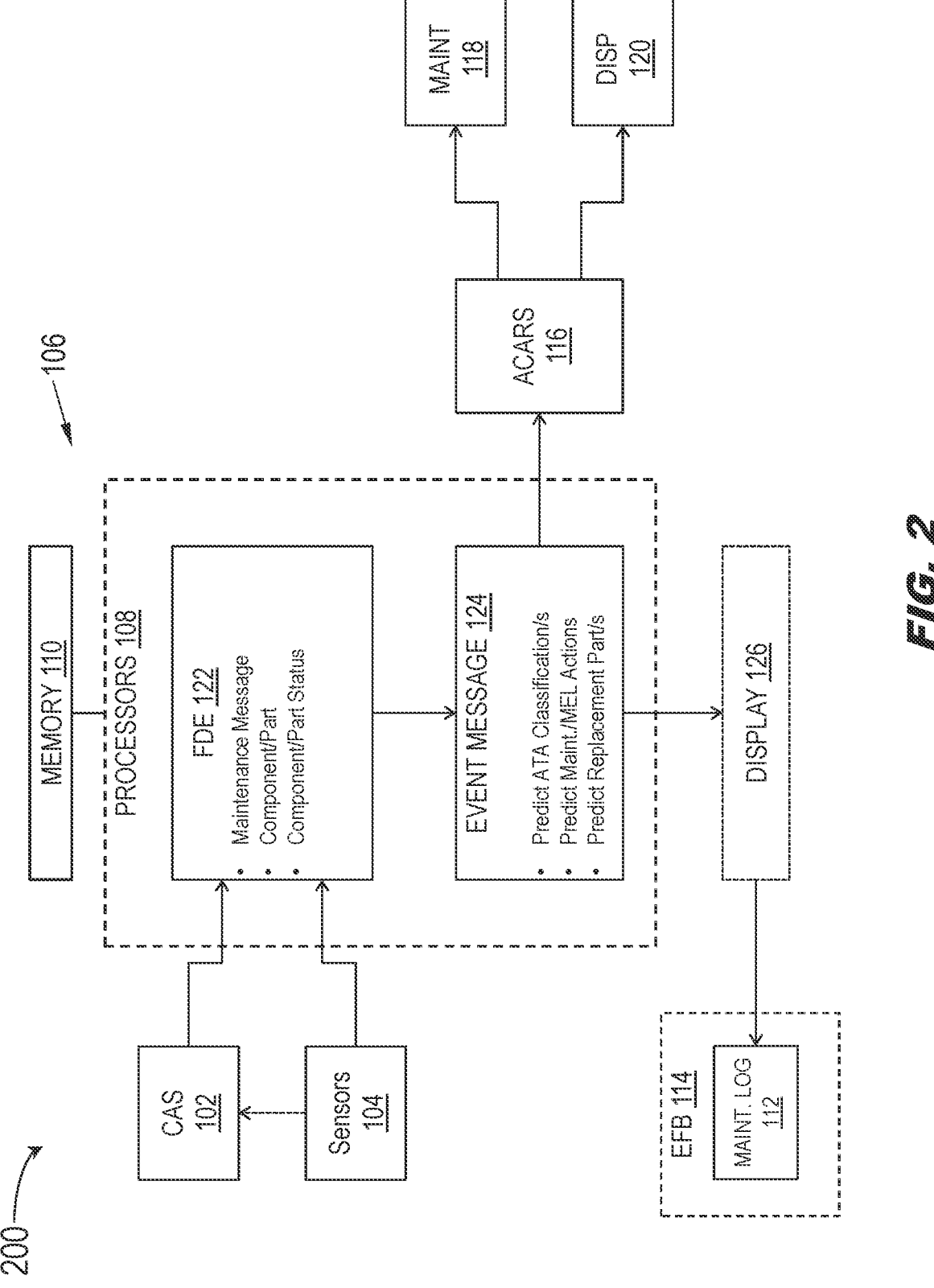
FIG. 2 is a block diagram illustrating a retrofit implementation of the aircraft-based system of FIG. 1 according to example embodiments of this disclosure; and and FIGS. 3A through 3B are flow diagrams illustrating an aircraft-based computer-assisted method for automated reporting and logging of aircraft maintenance events in accordance with example embodiments of this disclosure.

Referring now to FIG. 2, the aircraft 200 may be implemented and may function similarly to the aircraft 100 of FIG. 1, except that the aircraft 200 may be a legacy aircraft wherein maintenance messages correlated with FDEs 122 reported by the CAS 102 and/or sensors 104 may not include detailed ATA documentation.

In embodiments, the logging system 106 of the aircraft 200 may include automated reasoning agents further trained via machine learning to predict ATA classifications and codes based on a correlated maintenance message. For example, the logging system 106 may parse the text of maintenance messages correlated with each FDE 122 received from the CAS 102 in response to a maintenance event, and predict any associated ATA classifications and codes for inclusion in the associated event message 124 (e.g., in addition to any related replacement parts or components, maintenance actions, and/or M/MEL actions) based on a correlated maintenance message or maintenance status included therein).

Referring now to FIG. 3A, the method 300 may be implemented by the logging system 106 and/or the aircraft 100, 200 and may include the following steps.

At a step 302, the logging system receives a message, alert, or flight deck effect (FDE) correlated with a maintenance message or alert triggered by a maintenance event within a system, subsystem, component, or part of the aircraft from the aircraft CAS and/or sensor banks. For example, the maintenance message may identify the system/s, component/s, or part/s affected and a maintenance status of the associated component (e.g., nominal, imminent failure, partial fault, replace soon, replace now, completely inoperable). In some embodiments, the maintenance message may specifically identify associated ATA classifications, codes, chapters, and/or subchapters. In some embodiments, the maintenance message may recommend specific maintenance actions based on a particular maintenance status.

At a step 304, the logging system generates an event message based on the correlated maintenance message. For example, the event message may include any information conveyed by the maintenance message correlated with the FDE. In some embodiments, the logging system may further predict associated ATA classifications codes, chapters, and/or subchapters relevant to the maintenance status (e.g., by parsing the maintenance message). In some embodiments, the logging system may predict a list of necessary replacement parts or components for resolving the maintenance status. In some embodiments, the logging system may predict additional recommended maintenance actions based on the received maintenance event/FDE. In some embodiments, the logging system may predict M/MEL actions (e.g., fault/failure classes, dispatch consequences, and/or rectification intervals) based on the maintenance message.

At a step 306, the event message is transmitted to a ground-based maintenance crews and/or a ground-based aircraft maintenance facility. For example, the event message may be transmitted via ACARS or other like aircraft-based data link system. In some embodiments, the event message may be truncated or otherwise revised prior to transmission.

At a step 308, the logging system enters the event message to a maintenance log of the aircraft. For example, the maintenance log may be embodied in an EFB or like cockpit-based or portable device.

Figure 3B:
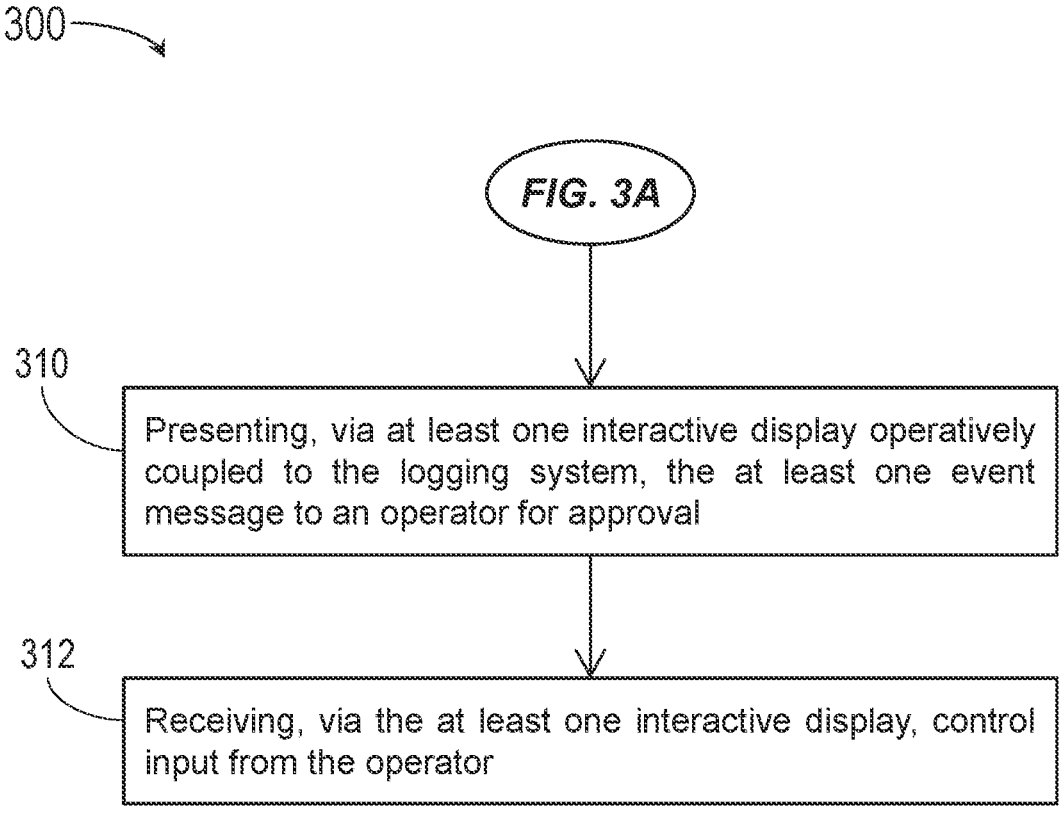

Referring also to FIG. 3B, the method 300 may include additional steps 310 and 312. At the step 310, the event message is presented to the pilot and/or flight crew via interactive display.

At the step 312, the interactive display accepts control input from the pilot or crew to approve or reject addition of the event message to the maintenance log. For example, when the received control input indicates approval of the event message, the logging system may proceed to enter the event message into the maintenance log. In some embodiments, the pilot or crew may modify the event message via control input entered through the interactive display prior to approval and/or entry into the maintenance log.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft-based system for automated reporting and logging of aircraft maintenance events, the system comprising at least one processor configurable via encoded instructions to:

receive at least one flight deck effect (FDE) from one or more of a component or a sensor of an aircraft, the FDE triggered by a maintenance event corresponding to at least one of an engine of the aircraft, a system of the aircraft, or the component, wherein the FDE includes a correlated maintenance message comprising one or more of an identification or a maintenance status of the engine, system, or component;

predicting at least one maintenance action based on the maintenance status;

generate at least one event message based on the correlated maintenance message, the at least one event message including at least one of the identification; the engine, system, or component; the maintenance status; and the predicted maintenance action;

transmit, via a data link system operatively coupled to the at least one processor, the at least one event message to one or more of:

a ground-based maintenance facility;
or
a ground-based dispatch facility;
and add the at least one event message to a maintenance log of the aircraft.

2. The aircraft-based system of claim 1, wherein the identifier includes a first ATA classification, and:

wherein the event message includes at least one second ATA classification predicted by the one or more processors based on the correlated maintenance message.

3. The aircraft-based system of claim 1, wherein:

the event message includes at least one of a replacement component or a replacement part predicted by the one or more processors based on the correlated maintenance message.

4. The aircraft-based system of claim 1, wherein the maintenance action is a first maintenance action, and wherein:

the event message includes at least one second maintenance action predicted by the one or more processors, the at least one second maintenance action based on the maintenance status.

5. The aircraft-based system of claim 4, wherein the at least one second maintenance action includes at least one Minimum Equipment List (MEL) action.

6. The aircraft-based system of claim 1, wherein the one or more processors are configured to:

present, via at least one interactive display operatively coupled to the one or more processors, the at least one event message to an operator for approval;

receive, via the at least one interactive display, control input from the operator;
and when the received control input is indicative of operator approval, at least one of transmit the event message or add the event message to the maintenance log.

7. The aircraft-based system of claim 1, wherein the one or more processors are configured to:

revise the at least one event message;
and transmit, via the data link system, the at least one revised event message.

8. The aircraft-based system of claim 1, further comprising:

at least one aircraft-based memory operatively coupled to the one or more processors, wherein the maintenance log is stored to the aircraft-based memory.

9. A computer-assisted method for automated reporting and logging of aircraft maintenance events, the method comprising:

receiving, via an aircraft-based logging system, at least one flight deck effect (FDE) from one or more of a component or a sensor of an aircraft, the FDE triggered by a maintenance event corresponding to at least one of an engine of the aircraft, a system of the aircraft, or the component; wherein the FDE includes a correlated maintenance message comprising one or more of an identification or a maintenance status of the engine, system, or component;

predicting, via the logging system, at least one maintenance action based on the maintenance status;

generating, via the logging system, at least one event message based on the correlated maintenance message, the at least one event message including at least one of the identification, the engine, system, or component, the maintenance status, and the predicted maintenance action;

transmitting, via an aircraft-based data link system operatively coupled to the logging system, the at least one event message to one or more of a ground-based maintenance facility or a ground-based dispatch facility;
and adding, via the logging system, the at least one event message to a maintenance log of the aircraft.

10. The method of claim 9, wherein the identification includes a first ATA classification, and wherein generating, via the logging system, at least one event message based on the received maintenance event includes:

predicting, via the logging system, at least one second ATA classification based on the correlated maintenance message;

wherein the at least one event message includes the at least one second ATA classification.

11. The method of claim 9, wherein generating, via the logging system, at least one event message based on the correlated maintenance message, the at least one event message including at least one of the identification, the aircraft component, and the maintenance action includes:

predicting, via the logging system, at least one of a replacement part or a replacement component based on the correlated maintenance message;

wherein the at least one event message includes the at least one predicted replacement part or replacement component.

12. The method of claim 9, wherein the maintenance action is a first maintenance action, and wherein generating, via the logging system, at least one event message based on the received maintenance event includes:

predicting, via the logging system, at least one second maintenance action based on the correlated maintenance message;

wherein the at least one event message includes the at least one second maintenance action.

13. The method of claim 12, wherein predicting, via the logging system, at least one second maintenance action based on the correlated maintenance message includes:

predicting, via the logging system, at least one Minimum Equipment List (MEL) action based on the correlated maintenance message.

14. The method of claim 9, wherein transmitting, via an aircraft-based data link system operatively coupled to the logging system, the at least one event message to one or more of a ground-based maintenance facility or a ground-based dispatch facility includes:

revising the at least one event message;
and transmitting the at least one revised event message.

15. The method of claim 9, further comprising:

presenting, via at least one interactive display operatively coupled to the logging system, the at least one event message to an operator for approval;

receiving, via the at least one interactive display, control input from the operator;

and wherein adding, via the logging system, the at least one event message to a maintenance log of the aircraft includes:

when the received control input is indicative of operator approval, adding the at least one event message to the maintenance log.

16. The aircraft-based system of claim 1, wherein the system is configured to:

confirm or reject the at least one maintenance event by validating the at least one corresponding FDE;

and add the determined confirmation or rejection of the at least one maintenance event to the at least one associated event message.

17. The method of claim 9, wherein generating, via the logging system, at least one event message based on the correlated maintenance message, the at least one event message including at least one of the ATA classification, the engine, system, or component, the maintenance status, or the maintenance action includes:

confirming or rejecting the at least one maintenance event by validating, via the logging system, the at least one corresponding FDE;

and adding the determined confirmation or rejection to the at least one associated event message.

\* \* \* \* \*